US009804713B2

(12) United States Patent
Guarneri et al.

(10) Patent No.: US 9,804,713 B2
(45) Date of Patent: Oct. 31, 2017

(54) METHOD AND SYSTEM FOR FINGER SENSING, RELATED SCREEN APPARATUS AND COMPUTER PROGRAM PRODUCT

(71) Applicant: STMicroelectronics S.r.l., Agrate Brianza (IT)

(72) Inventors: Nunziata Ivana Guarneri, Caltanissetta (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 62 days.

(21) Appl. No.: 14/037,359

(22) Filed: Sep. 25, 2013

(65) Prior Publication Data

US 2014/0085260 A1    Mar. 27, 2014

(30) Foreign Application Priority Data

Sep. 27, 2012  (IT) .............................. TO2012A0842

(51) Int. Cl.
*G06F 3/044*     (2006.01)
*G06F 3/041*     (2006.01)

(52) U.S. Cl.
CPC ............ *G06F 3/044* (2013.01); *G06F 3/0416* (2013.01)

(58) Field of Classification Search
CPC ........ G06F 3/0354; G06F 3/041; G06F 3/045; G06F 3/0488; G06F 3/044; G06F 3/03457; G06F 3/04883; G06F 3/038; G08C 21/00; G09G 5/00; G06K 9/00375
See application file for complete search history.

(56) References Cited

U.S. PATENT DOCUMENTS

2003/0146899 A1*  8/2003  Sakurai ............... G06F 3/03547
                                              345/156
2007/0075982 A1*  4/2007  Morrison .............. G06F 3/0428
                                              345/173
2009/0254869 A1   10/2009 Ludwig et al.
(Continued)

OTHER PUBLICATIONS

Search Report for Italian patent application No. TO2012A000842; The Hague, Holland, Jun. 17, 2013, 2 pages.

*Primary Examiner* — Lun-Yi Lao
*Assistant Examiner* — Johny Lau
(74) *Attorney, Agent, or Firm* — Seed IP Law Group LLP (57) ABSTRACT

An embodiment of a method for processing finger-detection data produced by a touch screen includes: computing the area of the finger-data map and extracting the main axes from the finger-data map, computing the lengths and orientations of the main axes, determining from the main axes a major axis having a major-axis orientation, computing a geometrical center and a center of mass of the finger-data map, computing an eccentricity of the finger-data map as a function of the lengths of the main axes outputting the major-axis orientation as indicative of the finger-orientation direction in the plane of the screen, outputting the mutual position of the geometrical center and the center of mass of the finger-data map as indicative of finger-pointing direction along the finger-orientation direction in the plane of the screen, and outputting a combination of the eccentricity and the area of the finger data map as indicative of finger orientation with respect to the plane of the screen.

17 Claims, 12 Drawing Sheets

(56) References Cited

U.S. PATENT DOCUMENTS

| | | | | |
|---|---|---|---|---|
| 2010/0044121 A1* | 2/2010 | Simon | ................ | G06F 3/03547 |
| | | | | 178/18.03 |
| 2010/0289754 A1* | 11/2010 | Sleeman | ............... | G06F 3/0416 |
| | | | | 345/173 |
| 2011/0025629 A1* | 2/2011 | Grivna et al. | ................ | 345/173 |
| 2012/0200523 A1* | 8/2012 | Westhues | .............. | G06F 3/0237 |
| | | | | 345/174 |
| 2013/0135218 A1* | 5/2013 | Jain | ....................... | G06F 3/0488 |
| | | | | 345/173 |

\* cited by examiner

METHOD AND SYSTEM FOR FINGER SENSING, RELATED SCREEN APPARATUS AND COMPUTER PROGRAM PRODUCT

PRIORITY CLAIM

The instant application claims priority to Italian Patent Application No. TO2012A000842, filed Sep. 27, 2012, which application is incorporated herein by reference in its entirety.

TECHNICAL FIELD

This disclosure relates to finger sensing, e.g., in touch screens.

Various embodiments may relate to finger sensing including, e.g., 2D finger shape orientation, 2D fingertip pointing direction, and 3D angle estimation.

SUMMARY

A wide range of applications of touch screens involve finger-sensing technology: smart phones, tablet computers, navigators, interactive display devices of various kinds, control panels, and remote controls of various types are exemplary of such applications.

In various sensing technologies, a finger that is approaching a touch screen may activate touch functionalities even before actually touching the screen.

For many applications, being able to determine the position and orientation of the finger, both in the 2D dimension (that is in the plane of the screen) and in the 3D dimension (that is with respect to the plane of the screen), possibly including the case of a finger "hovering" at approximately 0-3 centimeter (cm) distance from the screen, may thus be of interest.

An embodiment meets such an interest.

Various embodiments include a method having features disclosed herein.

Certain embodiments may also relate to a corresponding system, a related touch-screen apparatus, as well as to a related computer-program product, loadable in the memory of at least one computer device and including software-code portions for performing the steps of a method according to an embodiment when the product is run on such a device. As used herein, reference to such a computer-program product is intended to be equivalent to reference to a computer-readable medium containing instructions for controlling an electronic device to coordinate the performance of a method according to an embodiment. Reference to "at least one computer" is intended to highlight the possibility for certain embodiments to be implemented in a distributed/modular fashion.

The claims as filed are an integral part of this disclosure.

Various embodiments may relate to a touching condition (i.e., a finger touching a screen); various embodiments may extend also to "hovering", for instance in the case of mutual sensing technology with a high-gain level.

Various embodiments may permit detecting the direction of touch.

Various embodiments may permit detecting the finger shape with respect the main-axis orientation of display (2D finger shape orientation) or detecting the fingertip pointing direction in one of a plurality of possible directions (for instance, eight directions, namely left, right, down, up, left-up, left-right, down-left, and down-right).

Various embodiments may permit detecting the angle which the finger forms with respect to the plane of the screen (3D angle).

Various embodiments may be based on touch map values; the main axes of the touch shape may be detected and characterized by their lengths and slopes and then a major axis providing the 2D finger shape orientation may be detected.

In various embodiments, 2D finger pointing detection may be performed by comparing the position on the plane of two points, namely a center of mass of the shape and a geometrical center of the shape.

In various embodiments, the 3D angle may be computed by using two measurements, e.g., the eccentricity of the shape and its area.

Various embodiments may provide a system able to produce, for each frame of (e.g., capacitive) raw data received as an input, output data including, e.g., two data sets relative to the 2D dimension and one data set relative to the 3D dimension.

In various embodiments, a system may be provided which processes raw input touch data (e.g., arranged in frames) to yield the following output data:
2D finger touch shape orientation;
fingertip pointing direction;
3D angle ($\theta$) between the finger axis and the 2D touch-screen plane.

Various embodiments may be very "light" from a computational point of view and may be implemented in various types of touch-screen apparatus.

BRIEF DESCRIPTION OF THE DRAWINGS

Various embodiments will now be described, by way of example only, with reference to the annexed figures, wherein.

DETAILED DESCRIPTION

Illustrated in the following description are various specific details aimed at an in-depth understanding of various exemplary embodiments. The embodiments may be obtained without one or more specific details, or through other methods, components, materials etc. In other cases, known structures, materials, or operations are not shown or described in detail to avoid obscuring the various aspects of the embodiments. Reference to "an embodiment" in this description indicates that a particular configuration, structure, or characteristic described regarding the embodiment is included in at least one embodiment. Hence, expressions such as "in an embodiment", possibly present in various parts of this description do not necessarily refer to the same embodiment. Furthermore, particular configurations, structures, or characteristics may be combined in any suitable manner in one or more embodiments.

References herein are used for facilitating the understanding of the reader and, thus, they do not define the scope of protection or the range of the embodiments.

Figure 1:
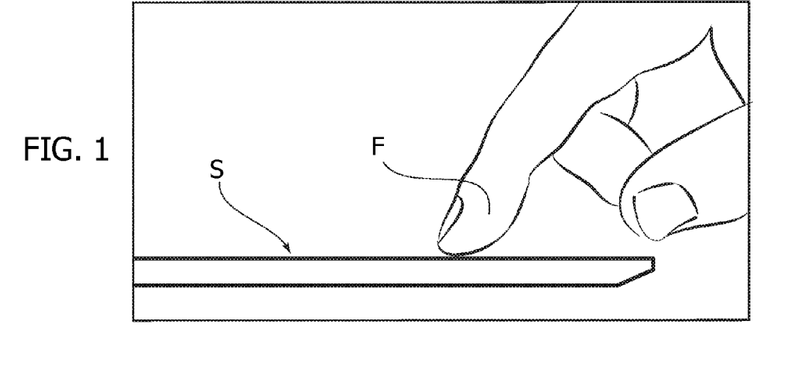
FIGS. 1 to 3 are exemplary of positioning of a finger with respect to a screen, according to an embodiment.

FIG. 1 is generally representative of a finger F of a user touching (or hovering in the vicinity of) a touch screen S, according to an embodiment.

While a flat screen S will be considered for exemplary purposes herein, various embodiments may apply to a non-flat screen for which a portion of surface intended to "interact" with a finger F may be locally approximated with a flat surface.

Figure 2:
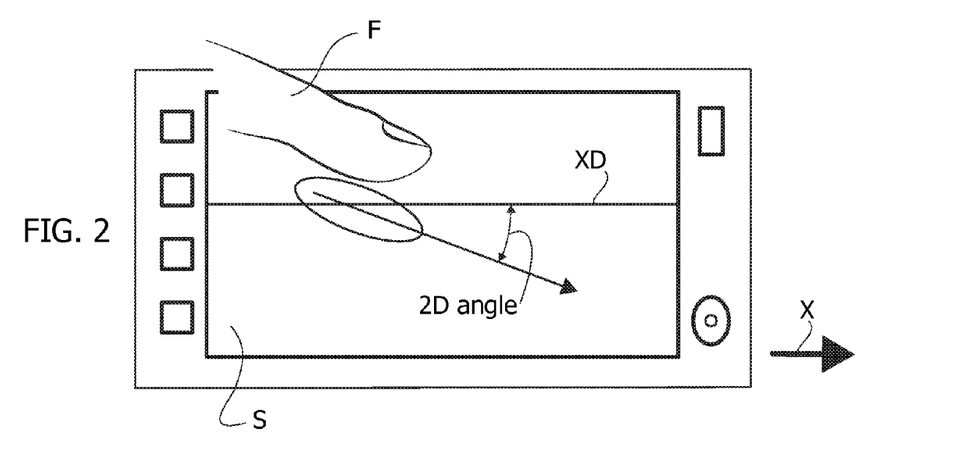

FIG. 2 is schematically representative of the possibility of defining the position of a finger F relative to a screen S as:

a bi-dimensional ("2D") finger shape orientation, that is the orientation—in—the plane of the screen S, e.g., an angle ("2D angle") formed in a reference direction XD such as a direction parallel to a main axis x of the screen in the exemplary case of a rectangular screen; and a fingertip pointing direction i.e., either forward or reverse in the direction of the line defining the finger orientation direction, according to an embodiment.

Figure 3:
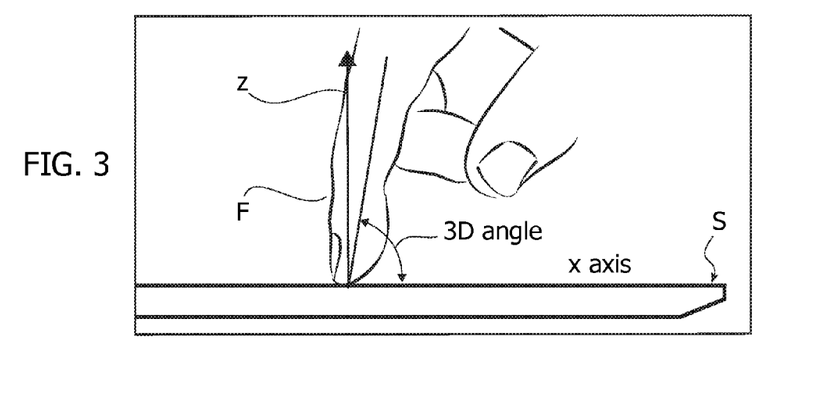

FIG. 3 is schematically representative of the possibility of defining the orientation—with respect to—the plane of the screen S, e.g., an angle ("3D angle") between the finger axis and the plane of the touch screen S (or an axis z orthogonal thereto), according to an embodiment.

Figure 4A:
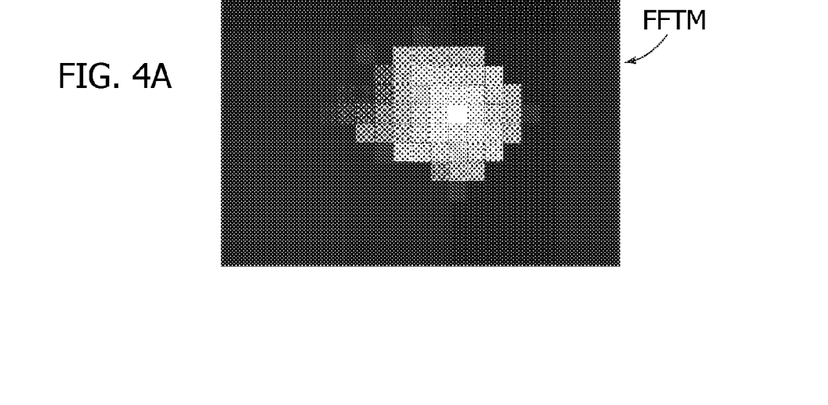
FIGS. 4A-4C and 5A-5D are exemplary of 2D finger orientation detection, according to an embodiment.
Figure 4B:
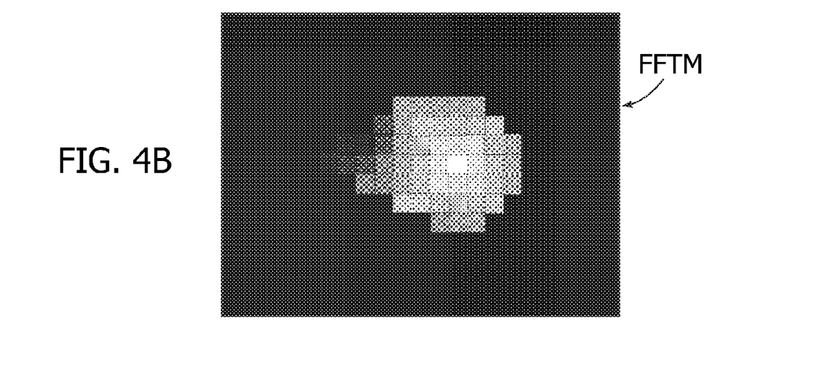
Figure 4C:
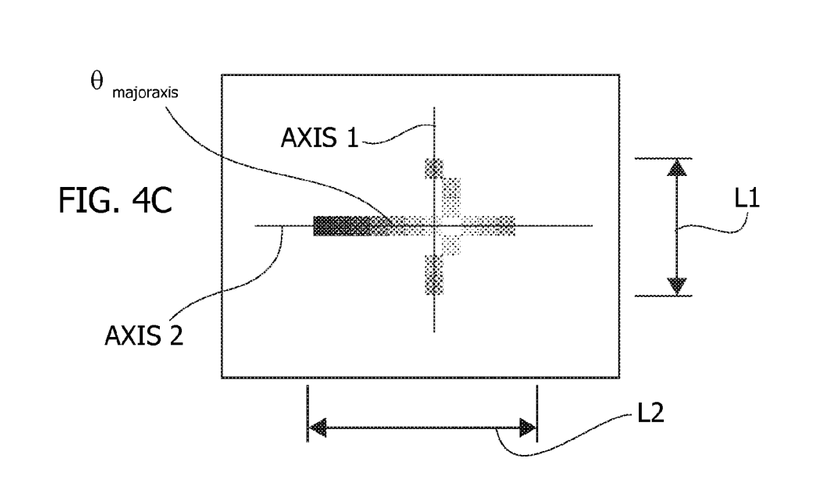

FIGS. 4A to 4C are exemplary of processing steps aiming at estimating the 2D finger shape orientation, according to an embodiment.

In such an exemplary embodiment, input data for processing may be a finger touch map FTM as currently obtained from a touch screen S by any known means depending on the touch-screen technology.

Throughout the instant detailed description of exemplary embodiments, a "touch" screen S and a finger "touch" map or shape will be referred to in accordance with the prevailing phraseology in this technical domain. As already indicated, various embodiments may extend also to a finger not actually "touching" the screen, but rather "hovering" at a small distance from the screen, for instance in the case of mutual sensing technology with a high-gain level. Consequently the "touch" map or shape as considered herein will be generally intended to be representative of a map or shape produced by a finger interacting with a touch screen even in the possible absence of actual, direct "physical" contact.

In various exemplary embodiments as considered herein, a finger touch map FTM including raw map data adapted to be processed may be captured by using any known touch-screen board, possibly equipped with a controller. The STMT05 S-Touch® FingerTip Multi-touch controller produced by STMicroelectronics, S.r.l. and a 4" touch capacitive display may be exemplary of a system adapted to process such map data.

A finger touch map FTM may be optionally processed, again by conventional image-processing means, via a (noise filtering) threshold in order to obtain a filtered finger touch map FFTM to single out the most useful shape data against the image background. For instance, in various embodiments, FFTM may be obtained from FTM by setting to zero all values of FTM below a filtering threshold $TH_{noise}$.

In various embodiments, a finger touch map FTM/FFTM may at least approximately correspond to a roughly elliptical finger shape or, more generally, to a shape or figure admitting two principal or main axes. These axes can be "extracted" from the FTM map by conventional image processing, e.g., by searching maximum intensity values for each row and for each column as schematically portrayed in FIG. 4C.

In various embodiments, the finger touch map being substantially elliptical may lead to extracting two principal axes extending orthogonal to each other, e.g., at 0° and 90° to the x axis of FIG. 4C. Also they will have respective axis lengths, e.g., L1=7 pixels (or nodes, according to the prevailing phraseology in touch-screen technology) and L2=11 nodes. Using pixel/node units for lengths, and 0° and 90° to the x direction of FIG. 4C as reference directions is for exemplary purposes only, and, therefore, is not mandatory for the embodiments.

In various embodiments, the axis data (node coordinates) make it possible to compute, as better detailed in the following, a 2D finger touch direction corresponding to a major-axis direction.

In the exemplary case of FIG. 4C, the horizontal axis, i.e., AXIS 2, may be longer than the vertical axis, i.e., AXIS1 (L2>L1), so the major axis is AXIS2 and its orientation may be determined as θmajoraxis=0°.

In the exemplary case of FIGS. 5A to 5D, processing of the finger touch map FTM/FFTM leads to locating two principal or main axes, AXIS1 and AXIS2, that are not orthogonal, but, again referring by way of example to the x axis of FIG. 2, are located at, say, 80° and 20° to the x direction, and also may have equal lengths of, e.g., L1=L2=6 pixels/nodes.

In various embodiments, the major-axis orientation may thus be estimated as the 2D-angle or direction of the line bi-secting (i.e., passing halfway between) the two principal or main axes AXIS1 and AXIS2, that is θmajoraxis=20°+ |80°−20°|/2=50°.

Despite their simplicity and low computational complexity, various embodiments as exemplified in the foregoing may provide accurate results in determining the 2D finger direction and may be effectively used, e.g., in the micro-controller and micro-actuator sectors.

Figure 6:
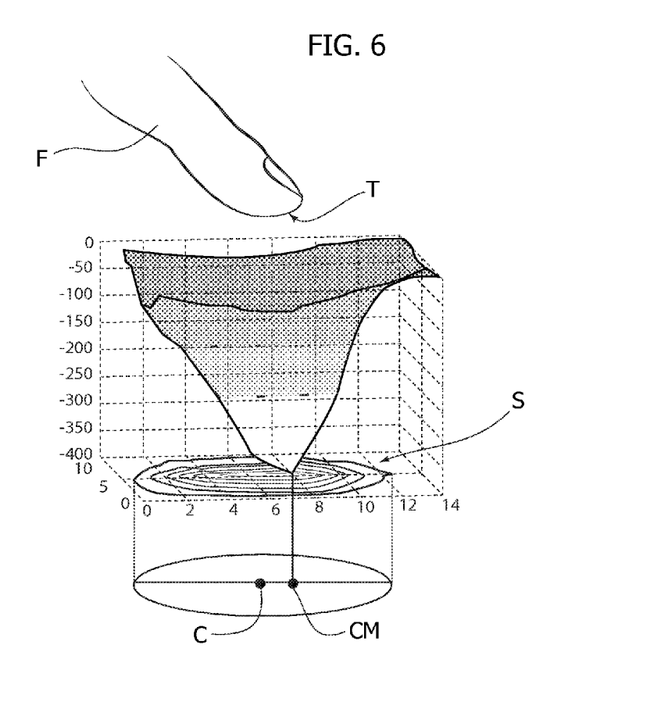
FIGS. 6, 7A to 7B, 8A to 8C, and 9A to 9C are exemplary of fingertip pointing-direction detection, according to an embodiment.

FIG. 6 describes that, due to its anatomy, when a finger F is near (or just in contact with) a touch screen S, a prominent part of the finger near to the fingertip T causes stronger intensity values in the finger touch map FTM with respect to other parts of the touch shape, according to an embodiment.

Consequently, an, e.g., elliptical 2D finger shape may have its center of mass (barycenter) CM not coincident with the center C of the map, and the position of the center of mass CM of the map with respect to the geometrical center C of the map may be indicative of the fingertip pointing direction, in that the fingertip T will expectedly point from the center C to the center of mass CM.

In various embodiments, the position of the center C and the position of the center of mass CM may be estimated starting from the finger touch map FTM/FFTM and the axes, e.g., AXIS1, AXIS2, or both AXIS1 and AXIS2 extracted therefrom.

For instance, in various embodiments, the coordinates $X_{Center}$ and $Y_{Center}$ of the geometrical center point of the touch map or shape may be computed as the average of the coordinates of the two extreme points of the major axes $X_A$, $X_B$ and $Y_A$, $Y_B$, that is:

$$X_{Center}=(X_B-X_A)/2$$

$$Y_{Center}=(Y_B-Y_A)/2$$

For instance, in various embodiments, the center of mass CM may be computed on the touch map or shape; its coordinates $X_{CM}$ and $Y_{CM}$ may be determined as:

$X_{CM} = \Sigma\Sigma i \cdot P(i,j)/\Sigma\Sigma P(i,j)$ $Y_{CM} = \Sigma\Sigma j \cdot P(i,j)/\Sigma\Sigma P(i,j)$ where:
P(i, j) denotes the detection signal intensity (i.e., the "weight" or "mass" which may be used to compute a center of mass) at a pixel/node in the finger touch map (possibly filtered) having coordinates i and j; P(i, j) may be representative of the touch data or the touch panel electrical response, e.g., being proportional to the intensity of touch or (inversely) proportional to the distance of the finger F from the screen plane, and in each pair of summations ΣΣ, the first summation extends over i=1, ..., N while the second summation extends over j=1, ..., M where N and M are the vertical and horizontal dimensions (in pixels/nodes) of the input map.

In certain cases, the center of mass may correspond to the intersection point of the axes AXIS1 and AXIS2.

Figure 9A:
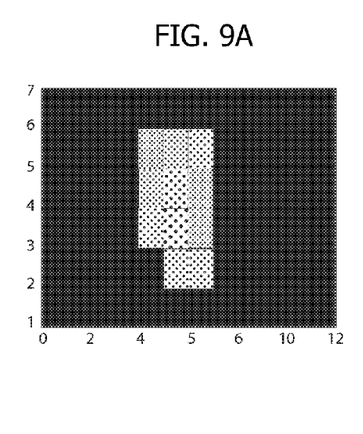
Figure 9B:
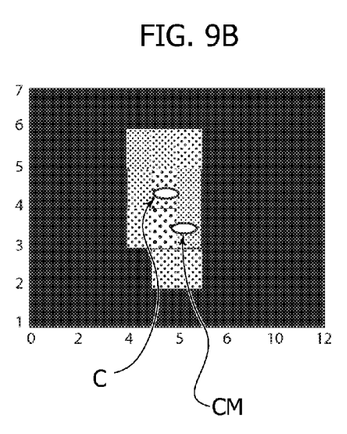
Figure 9C:
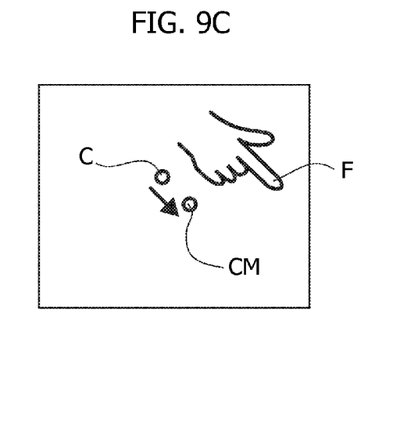

As schematically depicted in FIGS. 8A to 8C and 9A to 9C, in various embodiments, the expectation that the fingertip T will point from the center C to the center of mass CM makes it possible to use the position of the center of mass CM with respect to the geometrical center C to detect plural pointing directions of a finger F, e.g., eight different finger pointing directions: up, down, left, right (as exemplified in FIG. 8C), up-right, up-left, down-left, and down-right (as exemplified in FIG. 9C). In various embodiments, the accuracy of the results may be checked by computing the angle of the line passing through the two points.

In various embodiments, 2D finger point detection may involve using plural centers of mass, e.g., building a theoretical "bounding box" around the finger shape (which may be by using data of the main axes) and computing plural centers of mass (e.g., four, one for each quadrant of the bounding box), and then evaluating, e.g., two nearest centers of mass with respect to the geometrical center to find the pointing direction in a direction that bisects (a line from the geometrical center C that extends between the two centers of mass).

In various embodiments, the touch data or the touch panel electrical response P(i, j) may be representative of the intensity of touch or the distance of the finger F from the screen plane. Various embodiments may thus determine the 3D angle (see FIG. 3) as correlated to the shape of the finger as projected into the 2D screen plane.

Figure 10:
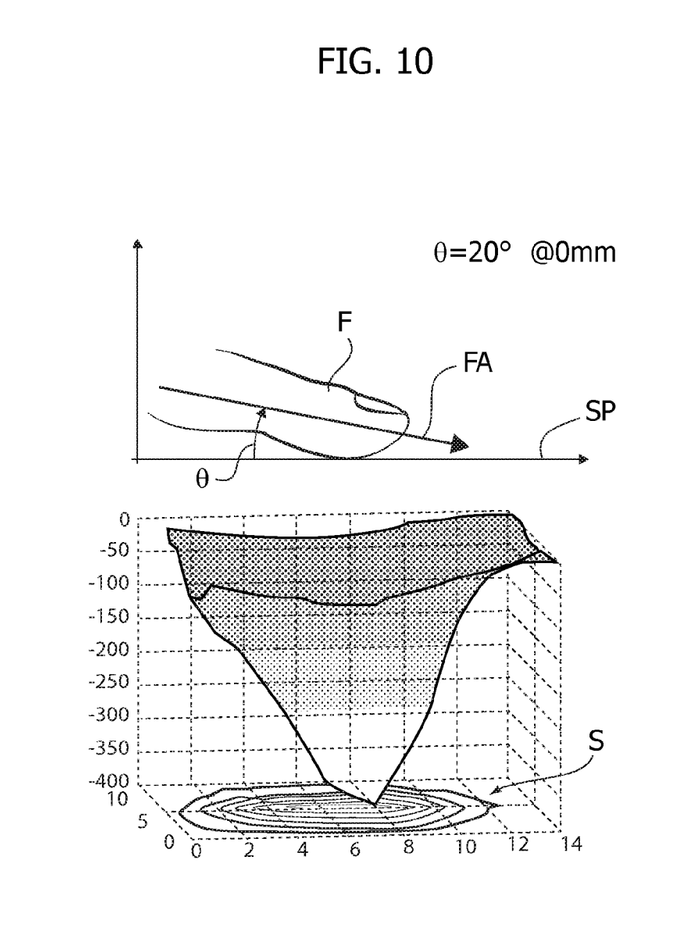
FIGS. 10, 11, 12, 13A to 13B, and 14 are exemplary of 3D angle detection, according to an embodiment.
Figure 11:
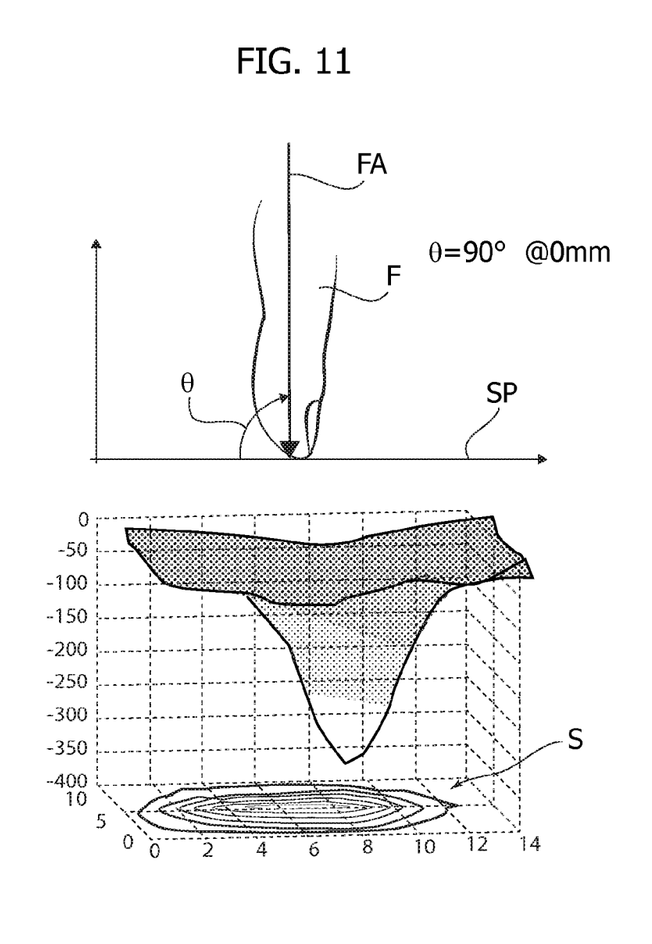

As schematically represented in FIGS. 10 and 11 the 3D angle θ, that is the angle formed by the finger axis FA to the screen plane SP, may be related to the 2D finger shape profile, in that a horizontal or nearly horizontal finger F (3D angle θ near 0° or generally small—FIG. 10) will produce a larger 2D finger shape profile than a vertical or nearly vertical finger F (3D angle θ near 90°—FIG. 11).

In various embodiments, estimation of the 3D angle may thus be based on the area size of the 2D touch shape, on an eccentricity value computed by taking into account major and minor axes, or on both the area size and the eccentricity value.

In various embodiments, the area size of the 2D touch map or shape and the eccentricity value in question may again be estimated starting from the finger touch map FTM/FFTM and the axes, e.g., AXIS1, AXIS2, or both AXIS1 and AXIS2 extracted therefrom.

For instance, in various embodiments, the following formulas may apply:
for the area size A of the 2D touch map or shape:

$A = \Sigma_{i,j} w$ where w=1 if p(i,j)≠0 and w=0 if p(i,j)=0
with p(i, j) being a noise-filtered FFTM) version of P(i, j), e.g., obtained from P(i, j) by setting to 0 all values of P(i, j) below a filtering threshold $TH_{noise}$;
for the eccentricity value E:
E=length longer axis/length shorter axis
where the length of the longer axis is the larger of $X_B - X_A$ and $Y_B - Y_A$ and the length of the shorter axis is the smaller of $X_B - X_A$ and $Y_B - Y_A$ depending on which axis is the longer and the shorter.

It has been observed that, in various embodiments, a combination of the eccentricity E and the area A of the 2D elliptical shape may represent a reliable measure for the 3D angle, e.g., in the form of a monotonically inverse function whereby the (finger-to-screen plane) 3D angle monotonically decreases/increases as E, A, or both E and A monotonically increase/decrease.

Figure 12:
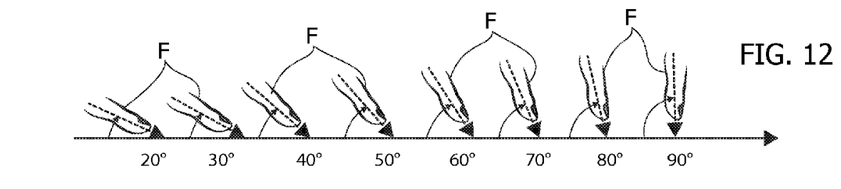
Figure 13A:
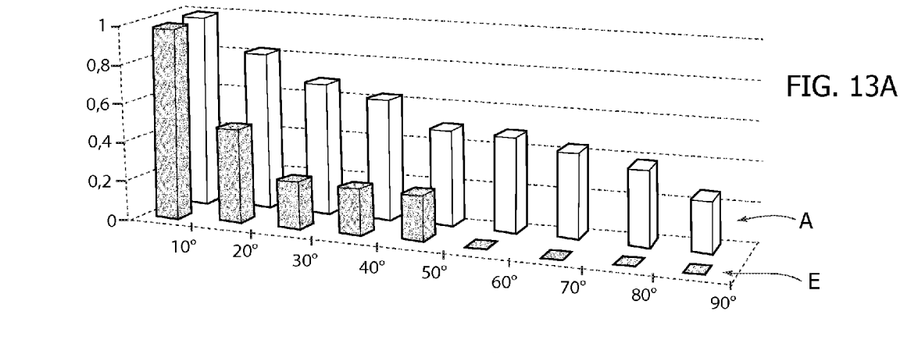

FIG. 13A is a normalized plot of nine values for E and A, respectively, normalized between [0,1], which were obtained by positioning a finger F on a screen and varying the 3D angle in the range of [10°, 90°] as schematically shown in FIG. 12 (a 3D angle of 10° is not depicted in FIG. 12 for the sake of simplicity).

It has been observed that, in various embodiments, a sum E+A of the eccentricity E and the area A (see FIG. 13B) may represent a reliable measure for the 3D angle.

In various embodiments, an approximate evaluation for the 3D angle may be provided by indicating whether the 3D angle is included in a first range R1 (e.g., 0° to 45°) or in a second range R2 (e.g., 45° to 90°). In such a case, respective threshold values ($TH_{area}$ and $TH_{eccentricity}$) may be applied to the values for A and E or a single threshold TH may be applied to the sum A+E (see again FIG. 13B) depending on the technical specifications of the touch screen, inch size and number of allowable nodes, and gain sensitivity in order to classify the 3D angle as belonging to R1 or R2.

Figure 14:
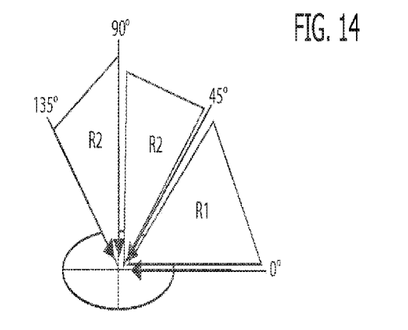

It has been observed that the 3D angle may vary in the range [0°,180°] with some 3D finger positions giving 2D mirror-like shapes as +45° and +135° (this is schematically shown in FIG. 14).

Various embodiments may thus consider only the range [0°, 90°], which may be sampled in two parts, i.e.:
Range1 (R1)→0°÷45°; and
Range2 (R2)→45°÷90°.

In various embodiments, the values for E and A may be subjected to respective thresholds $TH_{area}$ and $TH_{eccentricity}$ and be logically processed as follows:
IF E≥$TH_{eccentricity}$ AND A≥$TH_{area}$→3D angle [0°, 45°] i.e., R1
IF E<$TH_{eccentricity}$ AND A<$TH_{area}$→3D angle [45°, 90°] i.e. R2.

The 3D angle may thus be classified as belonging to the range R1 or R2 based on eccentricity and area values. In various embodiments, the thresholds $TH_{area}$ and $TH_{eccentricity}$ used to classify a 3D angle as belonging to R1 or R2 may be "tuned" by considering the specific application, for instance in order to take into account the display resolution.

In various embodiments, evaluation of the 3D angle and the fingertip pointing direction may exploit results of processing (e.g., extraction and calculation of lengths of main axes) already performed for the computation of 2D finger orientation.

This may be of interest in various applications such as, e.g., those applications where a user's finger is intended to be used as a joystick.

Figure 15:
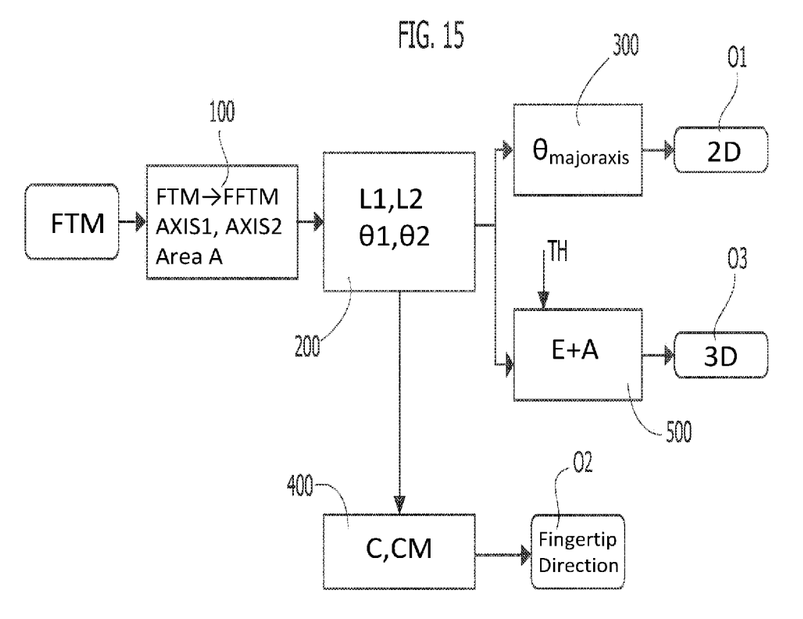
FIGS. 15 to 20 are flow charts exemplary of processing, according to an embodiment.

FIG. 15 is representative of exemplary processing which may underlie various embodiments. Various embodiments may be "light" (i.e., of reduced onus) from a computational point of view, which makes such processing adapted to be implemented by processing resources associated even with simple and inexpensive touch-screen apparatuses.

In various embodiments, in a first processing block 100 in the diagram of FIG. 15, the input map FTM (e.g., in the form of an M×N matrix of pixels/nodes) may be subjected to processing including:
  threshold processing against a (noise) threshold $TH_{noise}$ to obtain a filtered finger touch map FFTM (see, e.g., FIG. 4B) in order to single out the most useful shape data against the image background;
  extraction of the principal or main axes AXIS1 and AXIS2 (see, e.g., FIGS. 4C and 5B-5C);
  computation of area A.

In various embodiments, the results of processing in the block 100 may be fed to a block 200 for processing including computation of axis lengths L1, L2 and orientation angles θ1, θ2 (see again FIGS. 4C and 5B to 5D).

In various embodiments, the results of processing in the block 200 may be distributed to three blocks 300, 400 and 500 for processing including:
  in the block 300: determination of the major axis and its direction θmajoraxis (see, e.g., FIGS. 4C and 5D), which may be output as 2D orientation, i.e., as a first output O1;
  in the block 400: computation of the geometrical center C and the center of mass CM (see, e.g., FIGS. 6 to 9A to 9C and the related description) with the determination of the fingertip pointing direction or orientation, which may be output as a second output O2; and
  in the block 500: computation of eccentricity E and combination (e.g., sum) with the area A, with possible thresholding (see, e.g., FIGS. 10 to 14 and the related description) with the determination of the 3D orientation, which may be output as a third output O3.

Figure 16A:
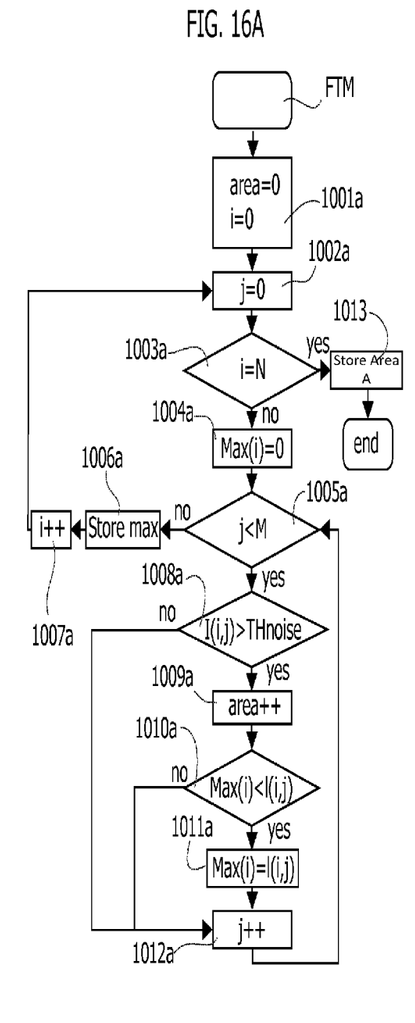
Figure 16B:
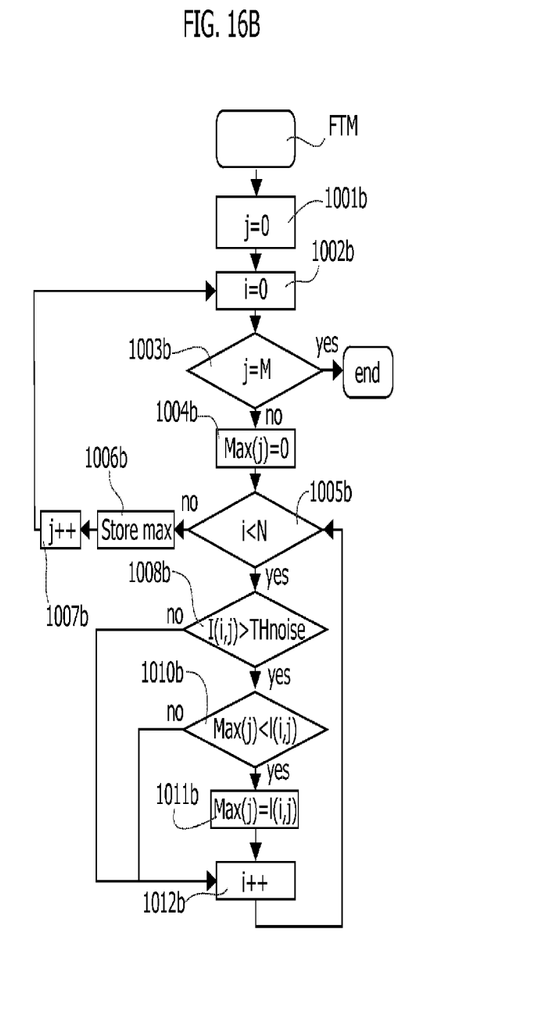

The flowcharts of FIGS. 16A and 16B are exemplary of possible implementations of processing within the block 100 which may be performed at least partly in parallel for the axis on rows (of the N×M input matrix) and for area computation (FIG. 16A) and for the axis on columns (FIG. 16B).

In the flowcharts of FIGS. 16A and 16B, the steps 1001a to 1007a to 1001b to 1007b are exemplary of computation of the area A (whose value is stored at 1013).

The steps 1008a, 1008b are exemplary of thresholding against a noise threshold $TH_{noise}$ to produce a FFTM, step 1009a is representative of area increase, while the steps 1010a to 1012a and 1010b to 1012b are exemplary of axis extraction (i.e., AXIS1, AXIS2).

Figure 17A:
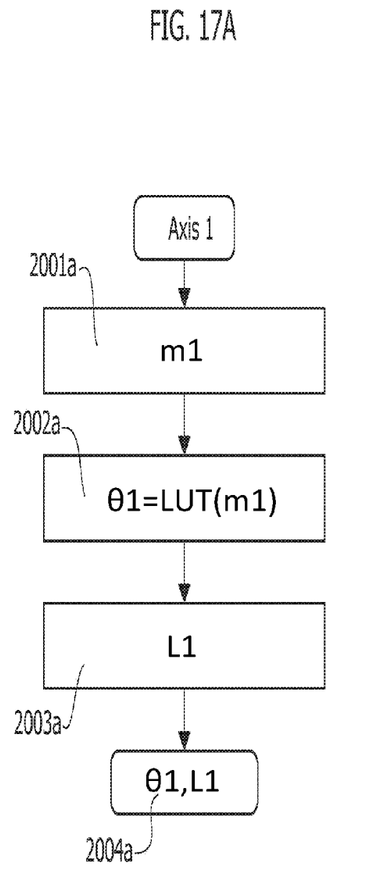
Figure 17B:
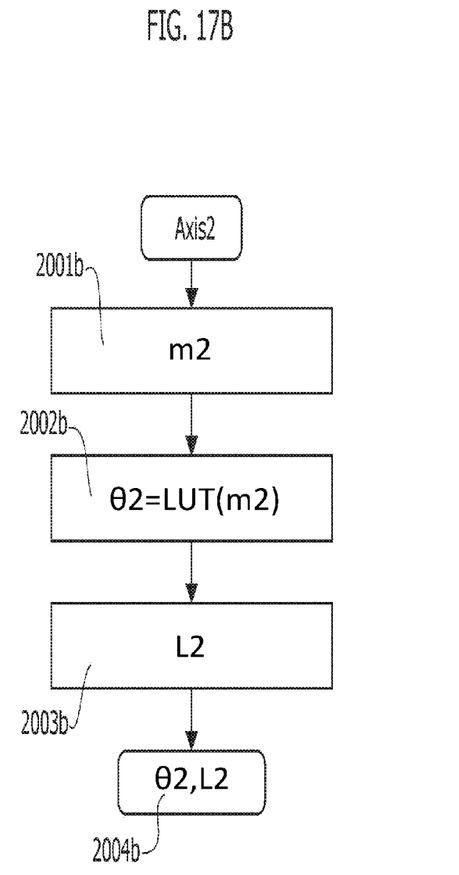

The flowcharts of FIGS. 17A and 17B are exemplary of possible implementations of processing on the axes extracted, i.e., AXIS1 and AXIS 2 within the block 200; in various embodiments this may again be performed at least partly in parallel for AXIS1 and AXIS2.

In the flowcharts of FIGS. 17A and 17B, the steps 2001a and 2001b are exemplary of computation of the angular coefficient (i.e., slope) of the line that better approximates that respective axis (see, e.g., FIGS. 4A and 5B-5D).

Figure 5A:
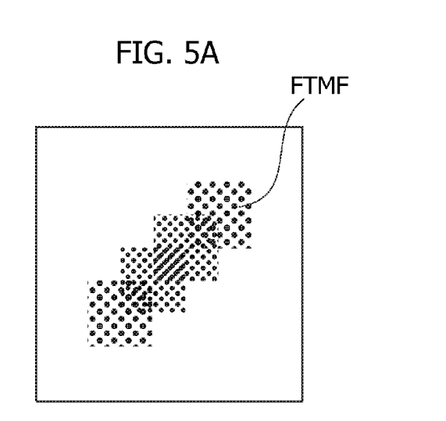
Figure 5B:
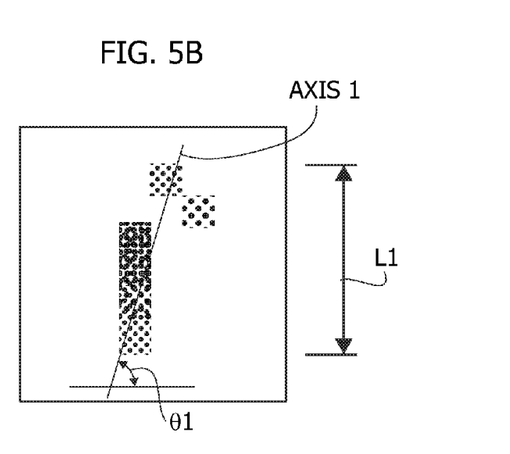
Figure 5C:
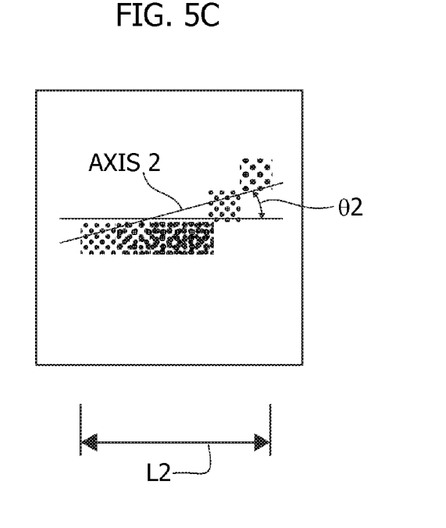
Figure 5D:
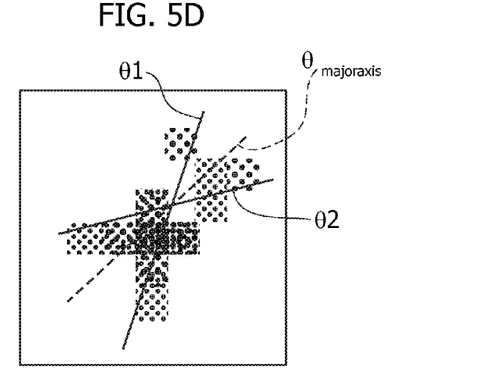

The steps 2002a, 2002b are exemplary of the computation of the axis direction θ1, θ2 (which may be accumulated, e.g., in a LUT according to a respective coefficient m1, m2 for, e.g., calculating the bisecting axis, see e.g., FIG. 5D).

The steps 2003a, 2003b are exemplary of the computation of the axis lengths (i.e., L1, L2) based, e.g., on the number of pixels/nodes in the direction of the respective axis.

The blocks 2004a, 2004b are representative of the results of block 200 being output, e.g., as pairs L1, θ1 and L2, θ2.

Figures 18, 20:
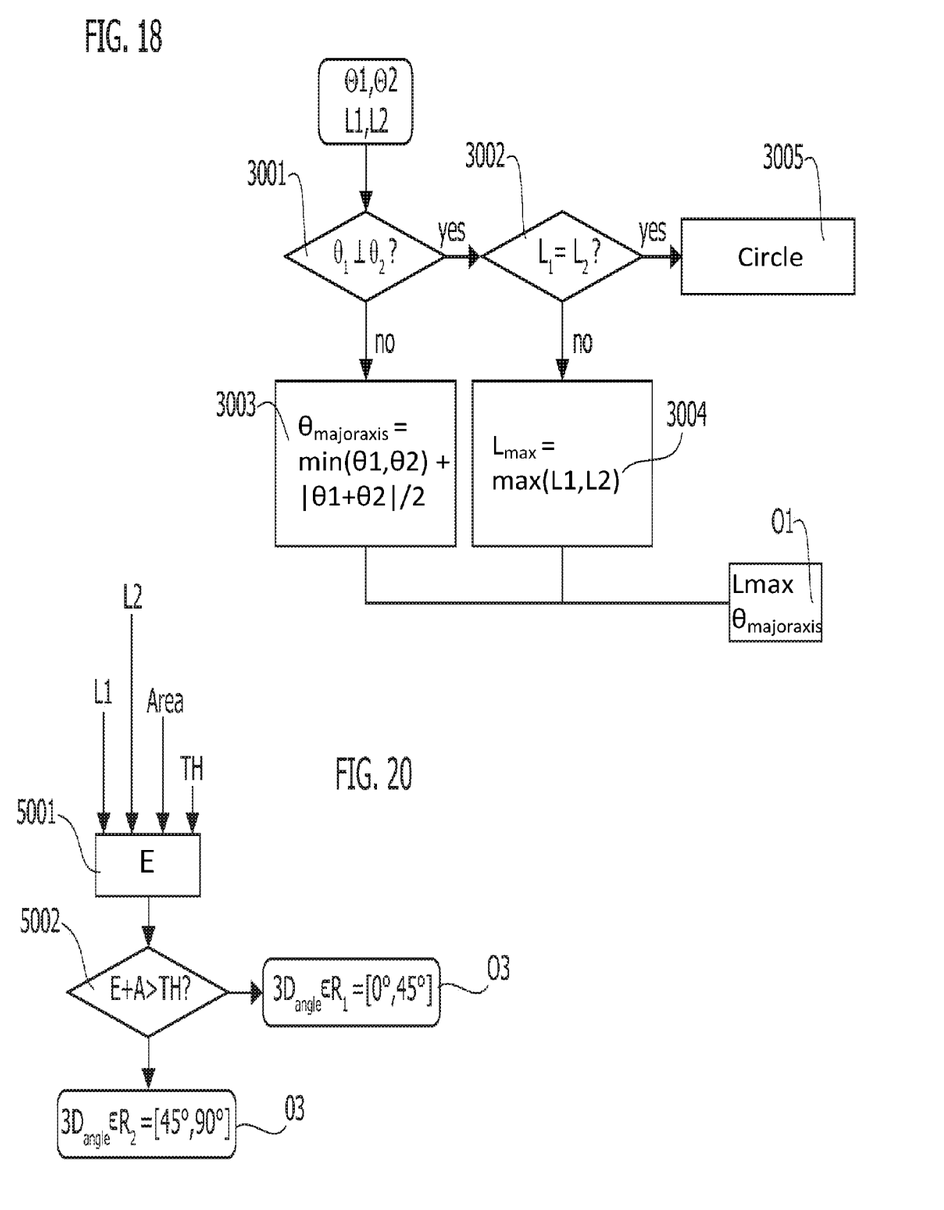

The flowchart of FIG. 18 is exemplary of possible implementations of processing on L1, θ1 and L2, θ2 in the block 300.

For instance, the steps 3001 and 3002 may be devoted to checking whether the conditions of FIG. 4C (θ1 orthogonal to θ2) or the conditions of FIGS. 5B-5C occur.

If the former condition (θ1 not at least approximately orthogonal to θ2) is not met (step 3001=no), the conditions of FIGS. 5B-5C occur; then in a step 3003, the major axis is estimated as the line bisecting (i.e., passing halfway between) AXIS1 and AXIS2 and the orientation may be computed as θmajoraxis=min(θ1, θ2)+|θ1−θ2|/2.

If θ1 is orthogonal to θ2 (step 3001=yes), in the step 3002 a check is made as to whether L1=L2.

In the negative (step 3002=no) the major axis is determined as the one having the longer length $L_{max}$ between L1 and L2, that is $L_{max}=\max(L1,L2)$ and
  if $L_{max}$=L1, then θmajoraxis=θ1
  if $L_{max}$=L2, then θmajoraxis=θ2.

In L1=L2 (step 3002=yes) the shape or map is held to have a circular shape with no predominant orientation.

In the latter case the possibility may exist of identifying a possible fingertip pointing direction by comparing the coordinates position of the geometrical center C with respect to the coordinates of the center of mass CM. In case these overlap no estimation may be performed; otherwise their positions are used to calculate the fingertip pointing direction.

The block labeled O1 in FIG. 18 is representative of 2D orientation being output as a first result.

Figure 19:
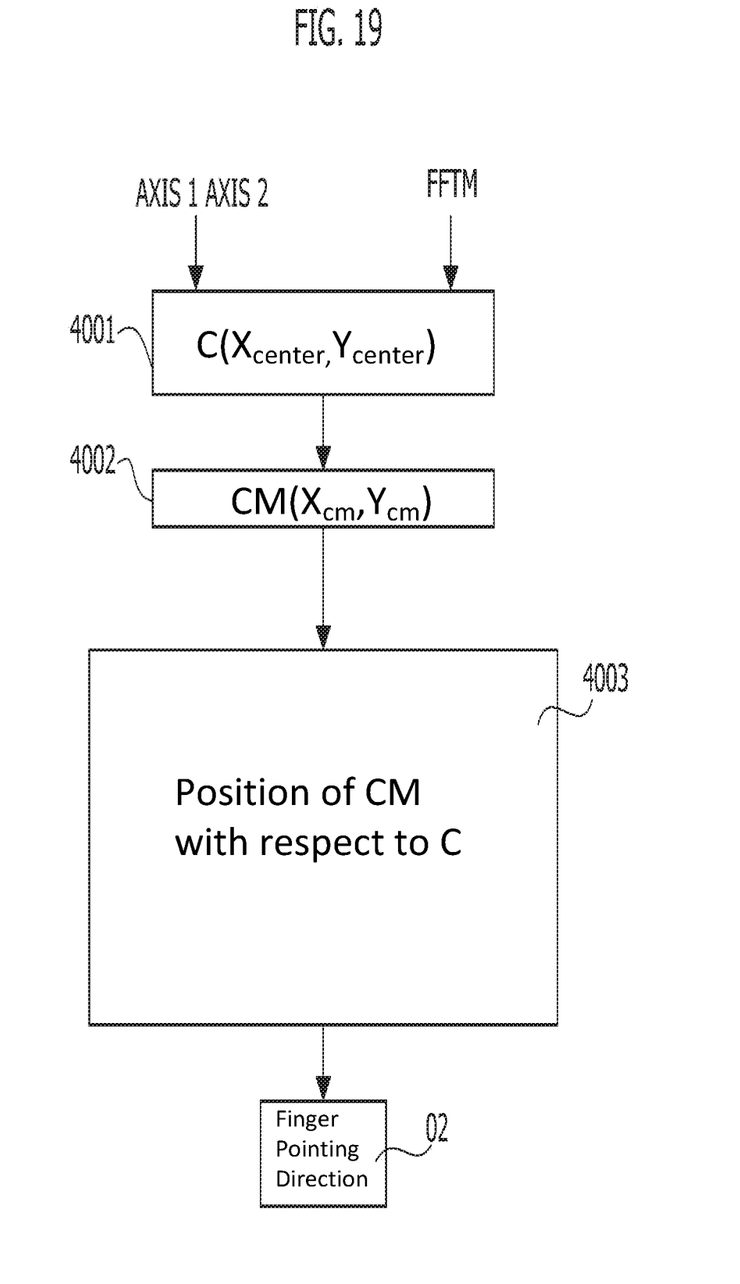

The flowchart of FIG. 19 is exemplary of possible implementation of processing performed in the block 400.

Figure 7A:
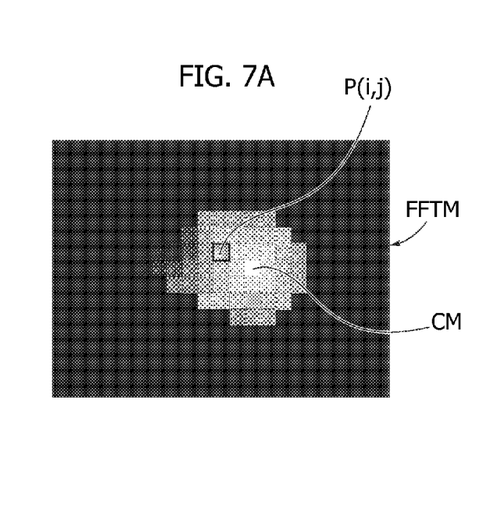
Figure 7B:
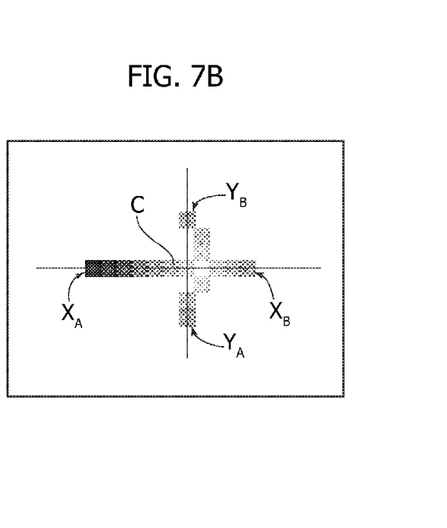
Figure 8A:
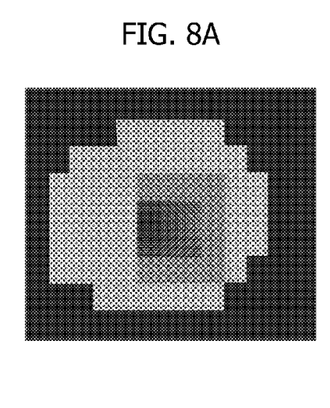
Figure 8B:
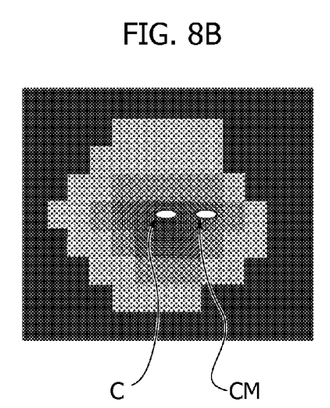
Figure 8C:
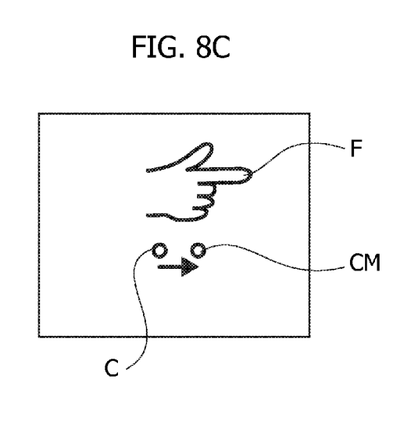

For instance, the steps 4001 and 4002 may be devoted to computing the geometrical center C ($X_{Center}$, $Y_{Center}$) and the center of mass CM ($X_{CM}$, $Y_{CM}$) as defined previously (see, e.g., FIGS. 6, 7A-7B).

In various embodiments, in a step 4003 the position of the center of mass CM with respect to the geometrical center C may be used to detect, e.g., plural finger pointing directions.

In various embodiments, a processing logic underlying the step 4003 may be as follows:
  if $X_{CM}<X_{Center}$ AND $Y_{CM}>Y_{Center}$, direction=up-left
  if $X_{CM}<X_{Center}$ AND $Y_{CM}<Y_{Center}$, direction=up-right
  if $X_{CM}>X_{Center}$ AND $Y_{CM}>Y_{Center}$, direction=down-right
  if $X_{CM}>X_{Center}$ AND $Y_{CM}<Y_{Center}$, direction=down-left
  if $X_{CM}<X_{Center}$ AND $Y_{CM}=Y_{Center}$, direction=up
  if $X_{CM}=X_{Center}$ AND $Y_{CM}>Y_{Center}$, direction=right
  if $X_{CM}>X_{Center}$ AND $Y_{CM}=Y_{Center}$, direction=down
  if $X_{CM}=X_{Center}$ AND $Y_{CM}<Y_{Center}$, direction=left.

The block labeled O2 is representative of the finger pointing direction being output as any of the above as second result.

Finally, the flowchart of FIG. 20 is exemplary of possible implementation of processing performed in the block 500.

For instance, the step 5001 may be devoted to computing the eccentricity E as defined previously (e.g., as the longer-to-shorter ratio of axis lengths L1 and L2). In a step 5002 the eccentricity is added to the area A (e.g., as computed in the block and stored in block 1013 of FIG. 16A).

Figure 13B:
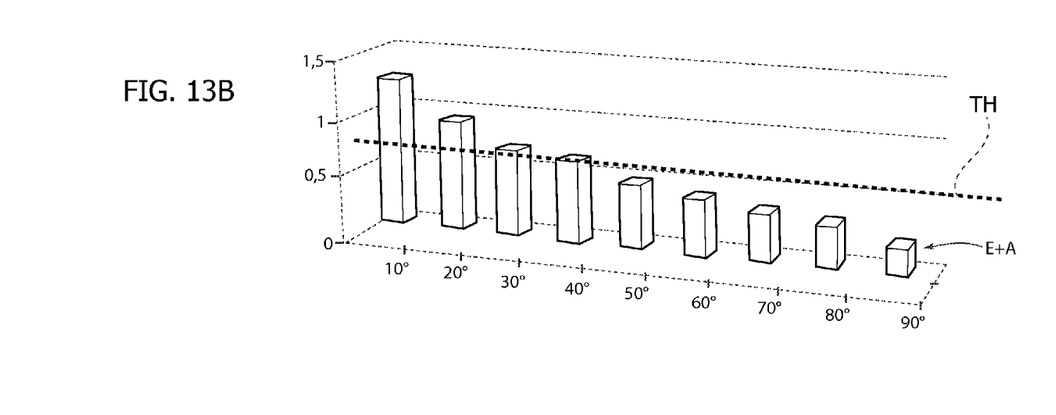

In various embodiments, a step 5001 may be devoted to adding the eccentricity E to the area A and subjecting the sum E+A to a threshold TH (see, e.g., FIG. 13B). The blocks labeled O3 are representative of the 3D angle being output as a third result of processing, e.g., as belonging to either of ranges R1, namely [0°, 45°] or R2, namely [45°, 90°].

Use of various embodiments can be detected based on a number of tests.

For instance, for 2D orientation and finger pointing direction one may capture the same finger shape (e.g., area=12 pixs, N=3, M=4) twice, namely:
- a first time by positioning a finger with a 3D angle=e.g., 140° and the fingertip pointing towards right, and
- a second time by positioning the finger with a 3D angle=e.g., 40° and the fingertip pointing towards left.

These would be two equal "touches" in terms of shapes (same area and same orientation), which an embodiment will discriminate as regards 2D orientation and fingertip pointing direction.

For instance, for the 3D angle, a specific set of touch shape captures can be performed by positioning a finger in order to produce a set of 3D angle values ranging from e.g., 20° to 90° with respect the screen plane (see, e.g., FIG. 13) to collect a corresponding set of e.g., eight maps.

Testing these maps against a tuned threshold, the system under test will classify, e.g., the first four maps in a first range R1 (e.g., from 20° to 40°) and the remaining maps in a second range R2 (e.g., from 50° to 90°).

As indicated, various embodiments may be very "light" to implement from a computational point of view for a number of reasons which may include (but not be limited to) one or more of the following:
- the main axes are extracted by detecting only a maximum on rows first and then on columns;
- these axes are extracted and their lengths (pixel/node size) are computed with their 2D direction determined, e.g., by using a Look Up Table;
- the fingertip pointing direction may be determined from the positions of the geometrical center and a center of mass of the finger map or shape;
- a 3D angle may be estimated by computing an eccentricity value (e.g., as a ratio of axis lengths) which may be summed to the touch shape area.

Various embodiments may thus rely on an approach where certain entities may be shared in an "integrated" process for the purposes of determining 2D direction, fingertip pointing direction, and 3D angle.

Without prejudice to the underlying principles of the disclosure, the details and embodiments may vary, even appreciably, with respect to what has been described herein by way of non-limiting example only, without departing from the spirit and scope of the disclosure. For example, any of the above-described operations may be performed in hardware, firmware, software, or a combination or subcombination of hardware, firmware, and software. Furthermore, any of the above-described functions may be performed by a computing circuit, such as a microprocessor or microcontroller, that executes software, firmware, or both software and firmware. Moreover, an integrated circuit such as a computing circuit may be coupled to a touch device (such as a touch screen) to form a system such as a smart phone, tablet computer, or laptop computer; the first integrated circuit may also be coupled to one or more other integrated circuits and to one or more input devices and one or more output devices other than the touch screen.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A system, comprising:
   a touch device including a touch screen configured to generate a finger data map, the finger data map including a plurality of rows and a plurality of columns of pixels, each pixel having a value; and
   a first integrated circuit coupled to the touch device, the first integrated circuit including circuitry configured to compute from the finger data map a plurality of parameters, these parameters including an area determined by summing each pixel in the finger data map having a value that is greater than a threshold value, two main axes of a touch shape corresponding to the finger data map along with lengths of the two main axes in terms of nodes and orientations of the two main axes, the two main axes being extracted from the finger data map based on maximum values of pixels in each row and each column of the finger data map, the circuitry further configured to compute, from the two main axes, a major axis having a major axis orientation and a geometrical center and at least one center of mass of the finger data map, and an eccentricity based on a ratio of the lengths of the two main axes, and the circuitry configured to process these generated parameters to generate a finger orientation direction in a plane of the touch screen using the major axis orientation, a finger pointing direction along the finger orientation direction using the geometrical center and the center of mass of the finger data map, and a three-dimensional finger orientation with respect to the plane of the touch screen using the eccentricity and/or the area of the finger data map, and the first integrated circuit further configured to control the operation of the system based on the finger orientation direction, finger pointing direction, and three-dimensional finger orientation.

2. The system of claim 1 wherein the first integrated circuit includes a computing circuit.

3. The system of claim 1, further comprising a second integrated circuit coupled to the first integrated circuit.

4. The system of claim 1 wherein the first integrated circuit and the touch device are formed in the same integrated circuit.

5. The system of claim 1 wherein the first integrated circuit and the touch device are formed as separate integrated circuits.

6. A method, comprising:
   computing an area of a finger data map, the finger data map including finger detection data generated by a touch screen, the finger data map including a matrix of rows and columns of nodes with each node having respective finger detection data and the computing the area being based on summing nodes having finger detection data exceeding a threshold value;
   extracting two main axes from the finger data map based on nodes in each row and each column having maximum values of finger detection data;
   computing lengths and orientations of the two main axes, each of the lengths of the two main axes being computed as a number of the nodes;
   determining from the two main axes a major axis having a major axis orientation;
   computing a geometrical center and at least one center of mass of the finger data map;
   computing an eccentricity of the finger data map as a ratio of the lengths of the two main axes;

generating finger orientation direction in a plane of the touch screen using the major axis orientation;

generating a finger pointing direction along the finger orientation direction in the plane of the touch screen using the geometrical center and the center of mass of the finger data map; and generating a three-dimensional finger orientation with respect to the plane of the touch screen using the eccentricity and/or the area of the finger data map.

7. The method of claim 6 further comprising filtering the finger detection data of the finger data map prior to performing the recited operations of computing, extracting, determining, and generating.

8. The method of claim 7, wherein filtering the finger detection data of the finger data map comprises setting to zero all values in the finger data map that are less than a filtering threshold function.

9. The method of claim 6, wherein determining from the main axes the major axis having the major axis orientation comprises determining a first one of the main axes has a longer length than a second one of the main axes, and using the orientation of the first one of the main axes as the major axis orientation of the major axis.

10. The method of claim 6, wherein determining from the main axes the major axis having the major axis orientation comprises determining the major axis is equal to the orientation that is halfway between the orientation of a first one of the main axes and the orientation of a second one of the main axes.

11. The method of claim 6, wherein computing the geometrical center of the finger data map comprises computing coordinates of the geometrical center of the finger data map as the average of coordinates of extreme points of the main axes.

12. The method of claim 6, wherein computing at least one center of mass of the finger data map comprises computing coordinates $X_{CM}$ and $Y_{CM}$ of the center of mass of the finger data map as follows:

$$X_{CM} = \Sigma\Sigma i \cdot P(i,j)/\Sigma\Sigma P(i,j)$$

$$Y_{CM} = \Sigma\Sigma j \cdot P(i,j)/\Sigma\Sigma P(i,j)$$

wherein P(i, j) denotes an intensity of a detection signal at a node in the finger touch map, the finger touch map including a plurality of nodes with each node being defined by coordinates i and j; and wherein in each pair of summations $\Sigma\Sigma$ the first summation and the second summation extends over horizontal and vertical dimensions of the finger touch map.

13. The method of claim 6, wherein generating the finger pointing direction along the finger orientation direction in the plane of the touch screen using the geometrical center and the center of mass of the finger data map comprises generating the finger pointing direction as corresponding to one of eight directions as defined according to the following table:

if $X_{CM} < X_{Center}$ AND $Y_{CM} > Y_{Center}$, direction=up-left;
if $X_{CM} < X_{Center}$ AND $Y_{CM} < Y_{Center}$, direction=up-right;
if $X_{CM} > X_{Center}$ AND $Y_{CM} > Y_{Center}$, direction=down-right;
if XCM>$X_{Center}$ AND $Y_{CM} < Y_{Center}$, direction=down-left;
if XCM<XCenter AND $Y_{CM} = Y_{Center}$, direction=up;
if XCM=XCenter AND $Y_{CM} > Y_{Center}$, direction=right;
if XCM>XCenter AND $Y_{CM} = Y_{Center}$, direction=down;
if XCM=XCenter AND $Y_{CM} < Y_{Center}$, direction=left;

wherein $X_{Center}$, $Y_{Center}$ or the coordinates of the geometrical center and $X_{CM}$, $Y_{CM}$ are the coordinates of the center of mass of the finger data map.

14. The method of claim 6, wherein generating the three-dimensional finger orientation with respect to the plane of the touch screen using the eccentricity and/or the area of the finger data map comprises summing the eccentricity and the area of the finger data map, with the sum being indicative of three-dimensional finger orientation.

15. The method of claim 6, wherein generating the three-dimensional finger orientation further comprises subjecting the eccentricity and the area of the finger data map to at least one orientation range threshold, where the three-dimensional finger orientation includes one of a plurality of orientation ranges determined by the at least one orientation range threshold.

16. A method, comprising:
computing an area of a finger data map, the finger data map including finger detection data generated by a touch screen and the finger data map including rows and columns of pixels, each pixel having a value, wherein the area is based on a summation of pixels having finger detection data exceeding threshold value;

extracting two main axes from the finger data map based on nodes in each row and each column having maximum values of finger detection;

computing lengths of the two main axes;

computing an eccentricity of the finger data map as a ratio of the lengths of the two main axes;

generating a three-dimensional finger orientation with respect to the plane of the touch screen using the eccentricity and the area of the finger data map, wherein generating the three-dimensional finger orientation includes:

determining whether the eccentricity is greater than or equal to an eccentricity threshold value;

determining whether the area is greater than or equal to an area threshold value;

determining the three-dimensional finger orientation is in a first range of zero to forty-five degrees if the eccentricity is greater than or equal to the eccentricity threshold value and the area is greater than or equal to the area threshold value;

determining whether the eccentricity is less than the eccentricity threshold value;

determining whether the area is less than the area threshold value;

determining the three-dimensional finger orientation is in a second range of forty-five to ninety degrees if the eccentricity is less than the eccentricity threshold value and the area is less than the area threshold value.

17. The method of claim 16, wherein computing the area of a finger data map comprises includes generating a filtered finger data map from the finger data map, each pixel in the filtered finger data map having a value of 1 if the value of the pixel does not equal zero and a value of 0 if the value of the pixel is equal to zero.

* * * * *